J. R. GAMMETER.
VEHICLE WHEEL RIM.
APPLICATION FILED MAR. 26, 1906.

969,779.

Patented Sept. 13, 1910.

WITNESSES:
Harry G. Sanders
Walter F. Thompson

INVENTOR
John R. Gammeter
BY
Seward Davis
ATTORNEY

UNITED STATES PATENT OFFICE.

JOHN RUDOLPH GAMMETER, OF AKRON, OHIO, ASSIGNOR, BY MESNE ASSIGNMENTS, TO THE UNITED RIM COMPANY, OF AKRON, OHIO, A CORPORATION OF OHIO.

VEHICLE-WHEEL RIM.

969,779.          Specification of Letters Patent.     Patented Sept. 13, 1910.

Application filed March 26, 1906. Serial No. 308,175.

*To all whom it may concern:*

Be it known that I, JOHN R. GAMMETER, a citizen of the United States, a resident of the city of Akron, county of Summit, and State of Ohio, have invented certain new and useful Improvements in Vehicle-Wheel Rims, of which the following is a specification, reference being had to the accompanying drawings, which form a part thereof.

My invention relates to the type of wheel rims adapted for use with pneumatic, solid or cushion tires of resilient material, and more particularly to rims adapted for use with tires which are designed to be applied and removed at will.

The objects of my invention are to provide a rim having one or both of the tire retaining rings or flanges removable in order to enable the tire to be easily and quickly applied and detached, and to furnish suitable locking means for the removable flange or flanges which will combine ease of operation with strength when in the locked position.

A further object of my invention is to obviate the use of nuts, bolts, turnbuckles, etc., which tend to weaken a structure of this character and to provide a device which, when locked, will present a practically continuous surface and have no interstices into which moisture or dirt can penetrate.

I am aware that rims have been constructed having removable flanges, but I believe that the form of locking means hereinafter described is broadly new.

Figure 1:
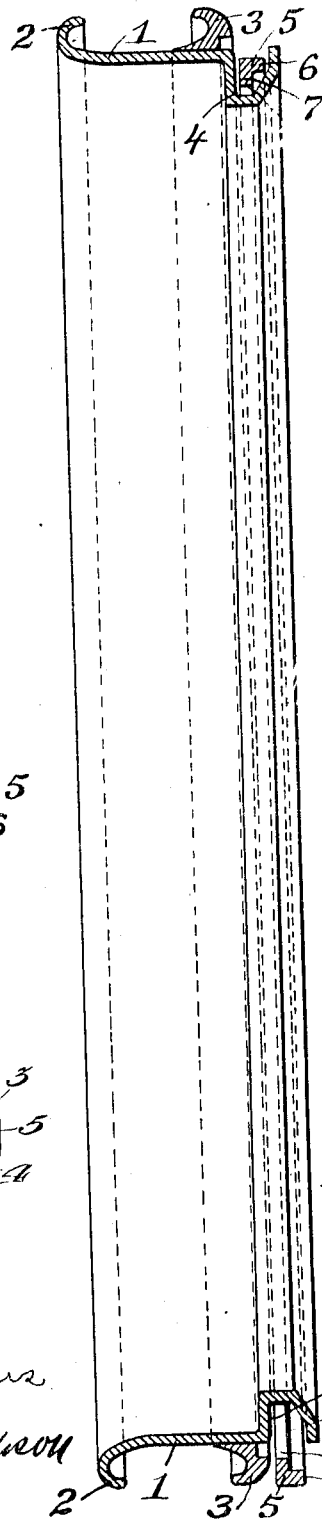
Figure 2:
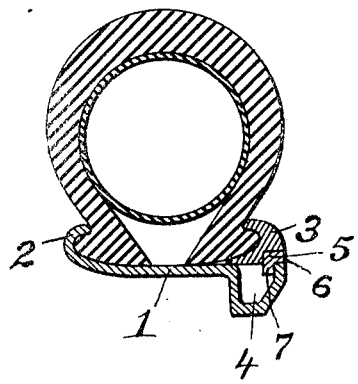
Figure 3:
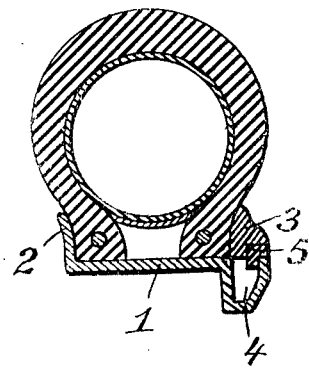
Figure 4:
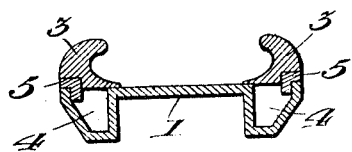
Figure 5:
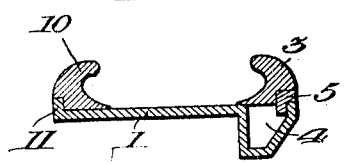

In the drawings, Figure 1 is a vertical section of the tire-seating member, removable tire-retaining flange and locking ring illustrating the method of detaching the locking ring. Fig. 2 is a cross section of a tire and rim showing the device in the locked position as applied to a clencher tire. Fig. 3 is a view similar to Fig. 2, showing a modified form of the tire retaining flange, adapted for use with tires of the so-called Dunlop type. Figs. 4 and 5 are cross sections of modified forms of rims in which both tire retaining flanges are removable.

These drawings represent a structure in which I have incorporated my improvements, although the invention can be embodied in many other forms without departing from its spirit. I do not wish, therefore, to be understood as limiting myself to the precise structure shown, but desire to claim the invention broadly, irrespective of the particular form of the parts.

The device consists of the rim proper or tire seating member 1, preferably of metal, which in general is permanently secured to the wheel felly. One tire retaining flange 2, I have shown as formed integral with the rim though if desired both may be made removable. The second tire retaining flange is a removable endless ring 3. Near the edge of the tire-seating member 1, upon which the detachable flange seats, is an annular groove 4, shaped to admit the endless locking ring 5. This locking ring has an inner diameter slightly less than that of the tire seating portion of the member 1 and of the outer wall of the groove and is slightly elastic to enable it to be sprung into and out of position. The form of this locking ring can be varied considerably, although the form shown in the drawings answers the purpose admirably. It has a horizontally projecting shoulder 6 of the proper shape and size to seat upon the outer edge of the wall of the groove 4, as shown in Fig. 2, and an inwardly projecting portion 7 which is of slightly less diameter than the said edge and, therefore, lies below the edge when the ring is in the locked position. The portion of the endless tire retaining flange which engages with the locking ring is shown as grooved to correspond with the form of that portion of the locking ring with which it engages, although this is not essential.

The mode of operation of my device is as follows: The parts being dismounted, the tire is applied to the tire-seating member and made to engage closely with the permanent tire retaining flange about the entire periphery of the wheel. The removable tire retaining flange is then slipped over the edge of the tire-seating member into engagement with the tire and the locking ring applied. This last operation can be very easily performed by simply inserting a portion of the locking ring into the groove and springing the ring over the outer edge of the wall thereof into the groove. The locking ring is then sprung outward against the outer edge of the wall, the groove upon the locking ring itself engaging with the said edge. The detachable flange is then moved outwardly against the locking ring and the tire inflated. The inflation of the tire will hold the parts securely in engagement and prevent any possibility of accidental disengagement. Should the tire become deflated, by reason of any accident, as occasionally happens when a pneumatic tire is used, it might be possible that the parts would become disengaged but the clips commonly used with this style of tire at the valve stem will keep the parts securely locked and prevent any possibility of such accidental disengagement. To remove the tire the clips, if used, are loosened and the tire wholly or partially deflated. The detachable flange is then pressed slightly inward until one part of the locking ring can be dropped into the groove. When this occurs, as is shown in Fig. 1, the portion of the locking ring opposite to the portion which has been dropped into the groove will project slightly beyond the rim, and by pulling outward on this portion the locking ring can easily be sprung off from the tire-seating member, whereupon the tire flange can also be removed and the tire taken off from the wheel. It is not always necessary to entirely remove the locking ring, as by slipping it down into its groove one side of the tire flange can be passed over it and beyond the tire-seating member when the flange can be dropped and entirely freed from the locking ring and tire-seating member.

Fig. 4 shows a modified form of rim in which both tire retaining flanges are made removable. The rim 1 is formed with a groove 4 at each edge, a pair of endless locking rings 5 being provided for retaining the detachable flanges 3. In Fig. 5 another way of making both flanges removable is shown. In this form the rim 1 is provided at one side with the flange 3, locking ring 5 and groove 4 of the construction already described, the tire retaining flange at the other side of the rim being in the form of a ring 10 held in place by an upturned flange 11 on the rim. The flange 10 can be removed after the flange 3 and tire are taken off. The constructions shown in these figures make possible the substitution of flanges of different shapes for the reception of the various types of tires.

Having described my invention, what I claim is:

1. In a wheel rim, in combination, a tire-seating member having a recess therein, a removable tire-retaining flange, and a substantially inextensible, endless locking ring shaped to enter said recess when out of operative position.

2. In a vehicle wheel rim, the combination of a tire-seating member, a removable, endless, tire-retaining flange, and a substantially inextensible endless locking ring, said tire-seating member being formed with a groove along one edge, and said locking ring being shaped to enter said groove, and to seat upon the edge of the outer wall thereof.

3. In a vehicle wheel rim, the combination of a tire-seating member having an annular groove near one edge thereof, a removable endless tire retaining flange adapted to seat upon the said tire seating member, and a substantially inextensible endless locking ring, the said locking ring shaped to enter said groove and provided with a projecting flange having a diameter slightly less than that of the edge of the outer wall of said groove.

4. In a wheel rim, in combination, a tire seating member having a circumferential groove therein, a tire retaining flange having an inner diameter not less than the maximum diameter of those portions of the tire seating member at one side of said groove, and a substantially inextensible endless locking ring having an inner diameter less than that of the outer edge of a wall of said groove and an outer diameter greater than the inner diameter of the retaining flange.

5. In a vehicle wheel rim, the combination of a tire-seating member having a groove adjacent one edge, a removable, endless, tire-retaining flange, and a substantially inextensible endless locking ring having an inner diameter less than the diameter of the outer edge of the wall of said groove, and an outer diameter greater than that of said edge, and being provided with a horizontally projecting shoulder adapted to seat upon the edge of said wall.

6. In a vehicle wheel rim, the combination of a tire-seating member having a groove along one edge, an endless tire-retaining flange, and a substantially inextensible endless locking ring adapted to enter said groove and having an inner diameter less than the diameter of the outer edge of the wall of said groove.

7. In a vehicle wheel rim, the combination of a tire-seating member having a groove along one edge, an endless tire-retaining flange, and a substantially inextensible endless locking ring adapted to enter said groove and having an inner diameter less than and an outer diameter greater than the outer edge of the wall thereof, said endless retaining flange being recessed to receive said locking ring.

8. In a vehicle wheel rim, the combination of a tire-seating member having a groove along one edge, an endless tire-retaining flange, and a substantially inextensible endless locking ring having an inner diameter less than and an outer diameter greater than that of the outer edge of the wall of the said groove, said retaining flange being recessed to receive said locking ring, and said locking ring being recessed to receive the outer edge of said wall.

9. In a wheel rim, in combination, a tire seating member having a groove along one edge, a removable tire retaining flange and a substantially inextensible endless locking ring having an inner diameter less than that of the outer edge of the wall of said groove and an outer diameter greater than the inner diameter of the retaining flange.

10. In a wheel rim, in combination, a tire seating member having a fixed tire retaining flange on one edge, and at the other edge being bent downward, outward and then upward to form a groove, the outer edge of said upward bent portion being of no greater diameter than the diameter of the tire seating portion, a removable endless tire retaining flange of a diameter to fit said tire seating portion and a substantially inextensible removable endless locking ring of L shaped cross-section, the vertical leg or flange of the said ring having an inside diameter less than the diameter of the outer edge of the said upwardly bent portion of the tire seating member, the horizontal leg or flange of said ring having an inside diameter equal to the diameter of the outer edge of said upwardly bent portion and an outer diameter greater than the inner diameter of said retaining flange, said retaining flange having a recess to receive said locking ring, the diameter of the outer wall of said recess being the same as the outer diameter of said locking ring.

11. A vehicle wheel rim constituting a seat for a tire and provided at one side with an offset forming a seat and a channel, an annular tire-retaining means mounted on said rim and extending over the offset, and an inextensible endless locking ring of less diameter than said rim mounted upon said seat formed by the offset and engaging said tire-retaining means for locking it against lateral displacement, said channel constituting a means to receive the ring in advance of positioning the ring on its seat.

JOHN RUDOLPH GAMMETER.

Witnesses:
WALTER K. MEANS,
ARTHUR E. DAVISON.